April 5, 1938.　　　O. K. KJOLSETH　　　2,113,465
RAILWAY TRUCK
Filed April 18, 1936
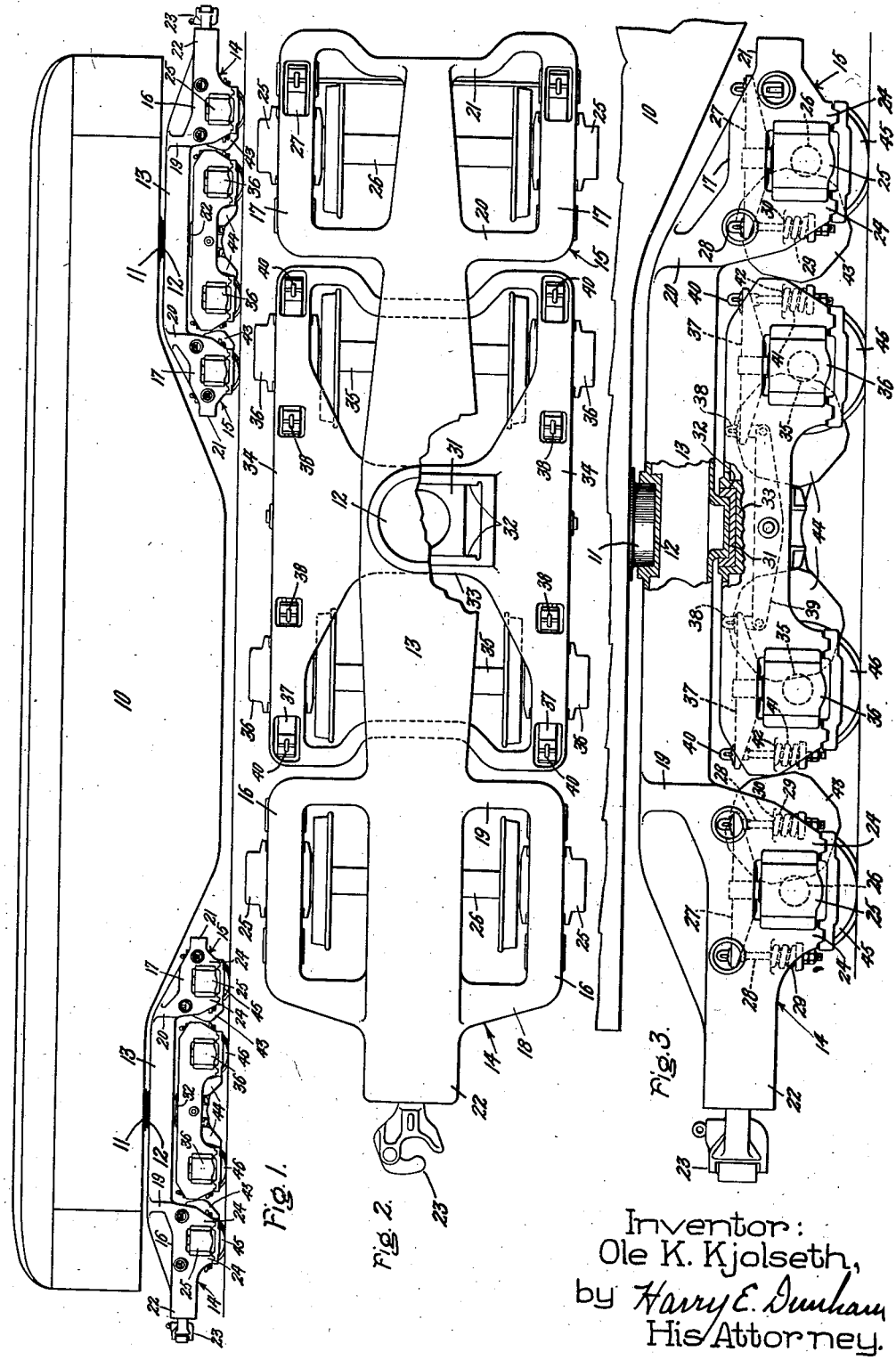
Inventor:
Ole K. Kjolseth,
by Harry E. Dunham
His Attorney.

Patented Apr. 5, 1938

2,113,465

UNITED STATES PATENT OFFICE 2,113,465

RAILWAY TRUCK

Ole K. Kjolseth, Erie, Pa., assignor to General Electric Company, a corporation of New York Application April 18, 1936, Serial No. 75,137

11 Claims. (Cl. 105—183)

My invention relates to railway vehicle trucks.

In constructing locomotives or cars, auxiliary trucks are usually provided to resist swaying or nosing of the platform structure or supporting frame at high speeds, and also to facilitate traversing curves in the track. These auxiliary trucks usually are arranged as pivoted guiding trucks and generally do not have driving axles, but are utilized to exert a turning movement on the front end of the frame. In high speed vehicles, such auxiliary trucks do not entirely suppress swaying or nosing at high speeds because of the relatively small distance between the axles of the trucks.

An object of my invention is to provide a railway truck having a long wheelbase to obtain high lateral stability and sufficient flexibility to traverse readily curves in the track.

Further objects and advantages of my invention will become apparent, and my invention will be better understood, from the following description referring to the accompanying drawing, and the features of novelty which characterize my invention will be pointed out with particularity in the claims annexed to and forming a part of this specification.

In the drawing, Fig. 1 is a side elevation of a railway vehicle embodying my invention; Fig. 2 is a plan view of my improved truck with a portion of the main truck broken away to show the arrangement of the laterally movable center bearing, the driving motors not being shown; and Fig. 3 is an enlarged side elevation of one of my improved trucks shown in Fig. 1 and including a portion of the railway vehicle frame.

Referring to the drawing, an electric locomotive having a frame including a superstructure 10 is supported by two center pins 11 engaging main center bearings 12 on longitudinally extending central frames 13 of main truck frames arranged near each end of the locomotive. These main truck frames are each provided with two end frames 14 and 15 having side frames 16 and 17 connected together by cross ties 18, 19, 20, and 21 and integrally connected together by the longitudinally extending central frame 13. An extension 22 on one end of the central frame 13 is constructed as a housing and supports a draft gear including a coupling 23. The main truck end frames 14 and 15 have pedestal jaws 24 which engage journal boxes 25 on main truck axles 26, and are supported thereon by a side spring rigging including semi-elliptical springs 27 connected by spring hangers 28 to the truck side frames through resilient coil springs 29 engaging spring seats 30 formed on the side frames 16 and 17. The truck axles 26 are widely spaced apart to provide a relatively long wheelbase and high lateral stability.

In order to obtain satisfactory distribution of load on the track and to facilitate traversing curves in the track, an auxiliary truck having a relatively short wheelbase is arranged intermediate the main truck end frames and axles, and this auxiliary truck is pivotally connected to the main truck frame by a laterally movable center bearing plate 31 arranged to carry part of the vehicle load on the main truck frame. This auxiliary center bearing plate 31 is supported between transverse parallel guides 32 arranged vertically below the main truck center bearing 12 on a transom 33 joining parallel side frames 34 of the auxiliary truck frame. The auxiliary truck is of the double axle type, and is provided with axles 35 journaled in journal boxes 36, which are spaced a relatively small distance apart to provide a small wheelbase. The auxiliary truck frame is supported on the journal boxes 36 by a spring rigging including semi-elliptical springs 37 connected by spring hangers 38 to an equalizer 39 pivotally mounted on the side frames and connected by spring hangers 40 to the side frame through resilient coil springs 41 engaging spring seats 42 formed on the side frames 34. The spring rigging for the auxiliary truck and the spring rigging for the main truck are constructed so that under all load conditions, the deflection of the springs 27 and 29 is so related to the deflection of the springs 37 and 41 that the load transferred to each of the journal boxes 25 and 36 and to the axles 26 and 35, respectively, bears a substantially predetermined desired relationship. When traversing a curve in the track, the flange of the outer wheel on the leading axle of each truck will exert a relatively small flange pressure and guide the truck into the curve by pivoting around the inner rear wheel of each respective truck. In this manner, the flange pressure is greatly reduced. If each of the four axles were rigidly connected to the same truck frame, the wheels of the last three axles would have to slip laterally on the rails under these conditions with a resultant high flange pressure.

The long wheelbase construction of the main truck frames tends to eliminate vibrations and swaying produced by irregularities in the track, as the main truck wheels are a relatively long distance apart. When the locomotive enters a curve in the track, the rigid connection of the main truck wheels, through the main truck axles and the main frame, causes these wheels to roll over the track at a relatively large angle, so that the contact surface between the main truck wheels and the track is decreased. The relatively short wheelbase of the auxiliary truck frame and its pivotal and laterally movable connection to the main frame enables the auxiliary truck wheels to more readily align themselves with the changing angle of the track and to roll over the track at a relatively small angle, so that the contact surface between the wheels and the track remains practically the same under all operating conditions, and in this manner aids in guiding the locomotive or car around curves in the track.

In the illustrated embodiment of my invention, the locomotive is propelled by a pair of motors 43 and 44 on each of the main and auxiliary truck frames. These motors are connected to driving wheels 45 and 46 through the driving axles 26 and 35, respectively. Thus, it is seen that I have provided a railway vehicle supported at each end on trucks of improved construction wherein a main truck frame is provided with a plurality of driving wheels and axles spaced a relatively long distance apart thereby providing the lateral stability inherent in trucks having a long wheelbase, and an auxiliary truck, arranged intermediate the main truck axles for supporting part of the vehicle load on the main truck frame, which is provided with a plurality of driving axles spaced a relatively short distance apart to impart thereto the flexibility inherent in trucks having a short wheelbase, so that the locomotive or car can easily pass around curves in the track without liability of derailment.

While I have illustrated and described one embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States is:

1. A railway vehicle having a vehicle frame, a truck including a main truck frame having a pair of end frames, means including a longitudinally extending central frame arranged to rigidly connect together said end frames and having a center bearing plate for supporting said vehicle frame, an auxiliary truck arranged intermediate said main truck end frames, and means for pivotally connecting said auxiliary truck frame and said main truck frame.

2. A railway vehicle having a plurality of trucks, each of said trucks having a plurality of main truck wheels and axles and including a main truck frame having side frames rigidly connected together and supported on said main frame wheels and axles, an auxiliary truck frame arranged intermediate said main truck axles, and means for supporting a part of the load on said main truck frame and a part of the load on said auxiliary truck frame.

3. A railway vehicle having a plurality of trucks, each of said trucks having a plurality of main truck wheels and axles and including a main truck frame having side frames rigidly connected together and supported on said main frame wheels and axles, an auxiliary truck frame arranged intermediate said main truck axles, and means for supporting a part of the load on said main truck frame and a part of the load on said auxiliary truck frame and for providing lateral movement of said auxiliary truck frame with respect to said main truck frame.

4. A truck for railway vehicles having a plurality of main truck wheels and axles and including a main truck frame having a pair of end frames rigidly connected together and supported on said main frame wheels and axles, a main center bearing arranged to support a part of the load on said main truck frame, an auxiliary truck frame arranged intermediate said main truck axles, and an auxiliary center bearing arranged to support a part of the load on said auxiliary truck frame.

5. A truck for railway vehicles including a main truck frame having a plurality of supporting wheels and axles, means including a main center bearing for supporting a part of the load on said main truck frame, an auxiliary truck frame having wheels and axles and being arranged intermediate said main truck frame axles, and means including a laterally movable auxiliary center bearing arranged to pivotally connect said main and auxiliary truck frames for supporting a part of the vehicle load on said auxiliary truck frame.

6. A truck for railway vehicles having a main truck frame comprising end frames and a longitudinally extending central frame rigidly connecting together said end frames, each of said end frames having an axle and wheels arranged to support said end frame, means including a main center bearing arranged on said central frame for supporting a part of the vehicle load on said main truck frame, an auxiliary truck having side frames and a bolster connecting said side frames and being arranged intermediate said main truck end frames, said auxiliary truck having wheels and an axle, and means for supporting a part of the load on said auxiliary truck frame.

7. A truck for railway vehicles having a main truck frame comprising end frames and a longitudinally extending central frame rigidly connecting together said end frames, means including a plurality of axles and wheels for supporting said main truck frame, means including a main center bearing arranged on said longitudinally extending central frame for supporting a part of the load on said main truck frame, an auxiliary truck having side frames and a bolster connecting said side frames and being arranged intermediate said main truck axles, means including an axle and wheels for supporting said auxiliary truck frame, and means including a laterally movable auxiliary center bearing arranged on said bolster to pivotally connect said main and auxiliary truck frames for supporting a part of the load on said auxiliary truck frame.

8. A railway vehicle having a vehicle frame, a truck including a main truck frame having a plurality of wheels and axles, said main truck frame having a pair of end frames rigidly connected together, means including a center bearing plate for supporting a part of the load on said vehicle frame on said main truck frame, an auxiliary truck frame arranged intermediate said main truck end frames, means including an axle and wheels for supporting said auxiliary truck frame, and means for supporting a part of the load on the vehicle frame on said auxiliary truck frame.

9. In combination with a railway vehicle, a vehicle frame, a truck including a main truck frame having a plurality of wheels and axles, said main truck frame having a pair of end frames rigidly connected together, a main center bearing arranged to support a part of the load on the vehicle frame on said main truck frame, an auxiliary truck frame arranged intermediate said main truck axles, means including an axle and wheels for supporting said auxiliary truck frame, and an auxiliary center bearing arranged to support a part of the load on the vehicle frame on said auxiliary truck frame.

10. In combination with a railway vehicle, a vehicle frame, a truck having a main frame comprising end frames and a longitudinally extending central frame arranged to rigidly connect together said end frames, each of said end frames having an axle and wheels arranged to support said end frame, means including a main center bearing arranged on said central frame for supporting a part of the vehicle load on said main truck frame, an auxiliary truck having side frames and a bolster connecting said side frames and being arranged intermediate said main truck end frames, means including an axle and wheels for supporting said auxiliary truck frame, and means including a laterally movable auxiliary center bearing arranged on said bolster to pivotally connect said main and auxiliary truck frames for supporting a part of the vehicle load on said auxiliary truck frame.

11. In combination with a railway vehicle, a vehicle frame, a truck having a main frame comprising end frames and a longitudinally extending central frame arranged to rigidly connect together said end frames, each of said end frames having an axle and wheels arranged to support said frame, means including a main center bearing arranged on said central frame for supporting a part of the vehicle load on said main truck frame, an auxiliary truck having side frames and a bolster connecting said side frames, said auxiliary truck being arranged intermediate said main truck end frames and under said main truck central frame, means including an axle and wheels for supporting said auxiliary truck frame, and means including a laterally movable auxiliary center bearing arranged on said bolster to pivotally connect said main truck central frame and said auxiliary truck bolster for supporting a part of the vertical load on said auxiliary truck frame.

OLE K. KJOLSETH.